United States Patent
Nakatsuka

[11] Patent Number: 6,075,304
[45] Date of Patent: Jun. 13, 2000

[54] STATOR WITH MOLDED ENCASEMENT FOR SMALL MOTORS AND MANUFACTURING PROCESS THEREFOR

[75] Inventor: Ginzoh Nakatsuka, Ueda, Japan

[73] Assignee: Alon Co., Ltd, Nagano-ken, Japan

[21] Appl. No.: 09/318,229

[22] Filed: May 25, 1999

Related U.S. Application Data

[62] Division of application No. 08/848,371, Apr. 30, 1997.

[51] Int. Cl.[7] .................................................. H02K 1/00
[52] U.S. Cl. ........................ 310/216; 310/43; 310/179; 310/258; 310/259; 29/596; 29/598
[58] Field of Search .............................. 310/216, 43, 179, 310/258, 259; 29/596, 598

[56] References Cited

U.S. PATENT DOCUMENTS

| | | | |
|---|---|---|---|
| 3,710,437 | 1/1973 | Kipple et al. | 29/596 |
| 4,825,114 | 4/1989 | Ohtsuka et al. | 310/90 |
| 5,124,607 | 6/1992 | Rieber et al. | 310/214 |
| 5,214,839 | 6/1993 | Rieber et al. | 29/596 |
| 5,350,960 | 9/1994 | Kiri et al. | 310/194 |
| 5,382,859 | 1/1995 | Huang et al. | 310/216 |
| 5,490,319 | 2/1996 | Nakamura et al. | 29/596 |

Primary Examiner—Nestor Ramirez
Assistant Examiner—Thanh Lam
Attorney, Agent, or Firm—Jordan and Hamburg LLP

[57] ABSTRACT

A stator has a lamination stack with a first electrically insulating layer and coil guides formed of high flow thermoplastic synthetic resin simultaneously insert-molded thereon. A coil is wound onto the stack and over the electrically insulating layer and the coil guides, and a second electrically insulating layer is molded over the coil to encase the coil. The second electrically insulating layer is formed of the high flow thermoplastic synthetic resin by injection molding. The method for producing the stator includes inserting the lamination stack into a first molding tool installed on an injection molding machine and injection molding onto the lamination stack the first insulation layer and the coil winding guides wherein the first insulation layer coats at least top and bottom surfaces and surfaces of slots of the lamination stack with thin resin skin insulation. The coil is then wound using insulated thin copper wire. The lamination stack is inserted into a second molding tool, having a gate disposed at a location where injected resin will not directly hit the coil, and the second insulator layer is then injection molded on the coil using the high flow thermoplastic synthetic resin injected at a filling pressure about 20 to 60% lower than a standard value for the high flow thermoplastic synthetic resin and at an injection speed more than twice as high as a standard injection speed for the high flow thermoplastic synthetic resin.

21 Claims, 2 Drawing Sheets

STATOR WITH MOLDED ENCASEMENT FOR SMALL MOTORS AND MANUFACTURING PROCESS THEREFOR

This is a division, of application Ser. No. 08/848,371, filed Apr. 30, 1997.

BACKGROUND OF THE INVENTION

The present invention relates to a stator having a molded casing and, more particularly, to a stator for small motors having a first molded layer on a stack and a second molded layer enclosing a coil and portions of the first molded layer. The stator has applications in small motors such as spindle motors or servo motors, which are used in hard disk drives, wherein thin insulation is required.

The ever increasing demand for hard disk drives with greater storage capacity has resulted in increasingly strict requirements for cleanliness of the driving unit. Motors have been found to be a source of particles, gas, organic substances, and ionic substances. Thus, spindle motors used in hard disk drives must not produce contaminants during operation. It has been found that particles are generated from the stator or the wound windings of the rotor coil due to abrasion. Improvement in the functioning of hard disk drives is achieved by enclosures for containing particles and gases generated by the coil and stack of the motor stator of the hard disk driving unit. Even trace foreign particles can adhere onto the magnetic head or hard disk and cause noise or a head crash. Therefore, it is necessary to prevent particles or gasses from being generated by the motor.

Various kinds of small or thin motors are applied in various fields, and the demand for further reduction in size is increasing. At the same time, simplification of the manufacturing process for such motors and improvements in reliability are required. Motor characteristics such as starting torque and power are improved when an insulator on the stack of the stator is thinner because more coil can be wound on the stator. Furthermore, a thinner insulation results in better thermal transfer characteristics allowing improved dissipation of heat generated by the motor. Finally, it is also necessary to protect against vibration, noise caused by electric current pulses and to increase durability of the hard disk unit.

In the conventional methods used to manufacture stators, multiple plates of punched thin thickness steel are interlocked to produce a lamination stack. The stack is then coated with insulation after an anti-corrosion treatment. Following the coating, a coil is wound after a winding guide is affixed. However, due to laminating the punched thin steel, the outer surface and slot being exposed is not be completely planar, thus resulting in recesses and projections.

A major issue for using an insertmolding process is the variation in the thickness of the laminated stack. Therefore, in order to perform insertmolding, screening of the thickness and adjustment of the core in the molding tool is required. The adjustment of the core in the molding tool further causes the formation of flash which requires deburring. Thus, the screening, the adjustment and the deburring add further costs to the production process.

A coating of 50–80 micron thickness is necessary to provide insulation on such rough surface. Prior to coating, costs are further increased by the requirement for a pretreatment of shotblasting or tumbling to effect deburring. Despite such steps, the coating is often left with pinholes which deteriorate the insulation or edges are left uncovered by the coating which results in low yields.

The manufacturing process is also complicated because the winding guide is affixed after the coating is applied. There is a method disclosed by published Japanese patents #63-3636 and #63-3637 which uses a steel lamination with thermoplastic synthetic resin pre-adhered on outer face surfaces of the two outer most steal plate laminations. After lamination of the steel plates, the synthetic resin is heated to deform and flow to coat edges of the laminations to provide insulation. However, a sufficient amount of synthetic resin on the steel plate laminations must be provided to permit the requisite amount of deformation and coating using such a method. Accordingly, the resin coating must be relatively thick to permit a sufficient flow to the center of the laminations for complete coverage with synthetic resin. Furthermore, it is rather difficult to coat the whole stack with uniform thickness.

Methods to enclose wound wire with synthetic resin have been suggested. When enclosing windings with synthetic resin, it is important not to damage the insulation of the wire by heat or pressure, and not to disturb the wound coil. In general, enclosing with synthetic resin is performed with thermosetting resin under low temperature (less than 120° C.) and low pressure. Bulk molding compound (BMC) is mainly used as resin material. The resin temperature is low, but the manufacturing cycle takes several minutes using such a method.

Some methods using injection molding have also been suggested for enclosing wound wire with synthetic resin. Published Japanese patent #61-10949 discloses inserting coiled wire into a molding tool for injection molding, setting the tooling temperature at a 120–150° C., using polyphenylenesulfide (PPS) resin with 20–40 wt % inorganic filler, and setting the resin temperature at 300–350° C. and injection pressure at 800–1000 kg/cm$^2$ in the process of coating the wound wire. This enables molding with relatively short cycle by using thermoplastic resin for enclosing wound wire since conventionally used thermosetting epoxy resin requires a longer molding cycle which results in low productivity. Since this method applies high pressure to inject molten resin at high temperature, it may be acceptable for applications where the diameter of wire is large enough and insulating coating of coil is thick enough to withstand the process. In applications involving coil wire of smaller diameter and a thin insulating coating of the coil wire, the wound coil is susceptible to being disturbed and the insulation coating of wire is prone to damaged. Thus, this method is not practical in such applications.

Published Japanese patent #3-70441 discloses a stack having multiple slots to be wound. The stack of the rotor with a rectifier and an outer surface of wound wire are enclosed by injection molding with insulating encapsulating material (polyacetal with glass fiber). The resin injecting position is located at an opposite surface of the rectifier and parallel with the axis of the rotor. Injection is performed in two stages. In the first stage an injection pressure of is 220 kg/cm$^2$ is used and in the second stage a pressure of 50 kg/cm$^2$ is used. However, the method relates to the rotor, not the stator, and differs from the object of the present invention. The technical point of the published patent is to specify the direction of resin injection to prevent disturbance of wound wire and minimize molding defects such as wrinkles and sink marks. The resin injection time is reduced to 2.5 seconds. Even with this shortened time, as the insulation coating of the winding of the stator for the small-sized precision motor is so thin, the wire is prone to damaged by the high temperature of molten resin. Also, as the initial injection pressure of 220 kg/cm2 is high, the wound coil is prone to being disturbed by the effect of injected resin.

Finally, published Japanese patent #6-327208 discloses an assembly of a stator block of an axial gap type DC brushless motor provided with multiple stator blocks having stacks of columnar soft magnetic material with coils wound between a set of permanent magnets affixed to the rotor. The coils are fixed by a resin having a major filler with a heat conductivity of more than 10 (w/m·k). The resin to be used is either thermoplastic and thermosetting resin, but the thermosetting resin is mainly described. Molding methods discussed include injection molding, which is not disclosed in detail, a potting method for liquid thermosetting resin, a transfer molding method for powder thermosetting resin, and a casting method, the particular method depending on the configuration. An epoxy resin containing a filler of improved heat conductivity, such as aluminum oxide or aluminum nitride, is also discussed but no reference to the flow character of such a resin is made.

SUMMARY OF THE INVENTION

Accordingly, it is an object of the invention to provide a stator with a molded encasement and a method for production thereof which overcomes the drawbacks of the prior art.

Accordingly, it is an object of the present invention to provide a stack produced with insulation for encasing the stack applied using a simplified manufacturing process which reduces defects and wherein the insulator and winding guides are simultaneously formed, and resistance and inductance is improved. Wound wire is enclosed with synthetic resin to prevent contaminants from spreading from the stator or abrasion of the wound wire of the rotor, and reduce vibration and noise generated by electric current pulses.

Briefly stated, the present invention provides a stator having a lamination stack with a first electrically insulating layer and coil guides both formed of high flow thermoplastic synthetic resin simultaneously insert-molded thereon. A coil is wound onto the stack and over the electrically insulating layer and the coil guides, and a second electrically insulating layer is molded over the coil to encase the coil. The second electrically insulating layer is formed of the high flow thermoplastic synthetic resin by injection molding. The method for producing the stator includes inserting the lamination stack into a first molding tool installed on an injection molding machine and injection molding onto the lamination stack the first insulation layer and the coil winding guides wherein the first insulation layer coats at least top and bottom surfaces and surfaces of slots of the lamination stack with thin resin skin insulation. The coil is then wound using insulated thin copper wire. The lamination stack is then inserted into a second molding tool, having a gate disposed at a location where injected resin will not directly hit the coil, and the second insulator layer is injection molded on the coil using the high flow thermoplastic synthetic resin injected at a filling pressure about 20 to 60% lower than a standard value for the high flow thermoplastic synthetic resin and at an injection speed more than twice as high as a standard injection speed for the high flow thermoplastic synthetic resin.

In accordance with these and other objects of the invention, there is provided an overmolded stator for small-sized motor having a stack which is insert-molded to form a first insulator layer of insulating high flow thermoplastic resin on the stack, coil windings wound on the stack over the first insulating layer, and a second insulating layer overmolded on the coil windings by injection molding using the same type of thermoplastic resin used for the first insulating layer.

The present invention also provides a manufacturing method comprising the steps of punching steel plate into a desired shape to form a requisite number of laminations for a lamination stack, interlocking the laminations together to form the lamination stack, inserting the lamination stack into a molding tool installed on an injection molding machine, undermolding the lamination stack with a high flow thermoplastic synthetic resin having desired insulation characteristics to coat at least top and bottom surfaces and slots of the lamination stack with a thin resin skin for insulation while simultaneously forming with the resin a hook member as a coil winding guide on a top surface of the stack, winding a coil of insulated thin copper wire using the hook member as a guide, overmolding the stator with the coil wound upon it by injection molding using the high flow thermoplastic synthetic resin used for undermolding at a filling pressure 20–60% lower than a standard value of the injection machine to be used and an injection speed at least twice as high as a standard injection speed using a molding tool having a gate disposed at a position where injected resin will not hit directly the wound coil of the stator.

According to a feature of the invention, there is further provided method for producing a stator with a lamination stack comprising: inserting the lamination stack into a first molding tool installed on an injection molding machine; injection molding onto the lamination stack a first insulation layer and coil winding guides formed of a high flow thermoplastic synthetic resin which is an electrical insulator, the first insulation layer coating at least top and bottom surfaces and surfaces of slots of the lamination stack with thin resin skin insulation and the coil winding guides being simultaneously formed integral with the first insulation layer on the top surface of the lamination stack; winding a coil of insulated thin copper wire over the first insulation layer and the winding guides; inserting the lamination stack with the coil into a second molding tool having a gate disposed at a location where injected resin will not directly hit the coil; and injection molding a second insulator layer on the coil using the high flow thermoplastic synthetic resin injected at a filling pressure about 20 to 60% lower than a standard value for the high flow thermoplastic synthetic resin and at an injection speed more than twice as high as a standard injection speed for the high flow thermoplastic synthetic resin.

The present invention further includes the second molding tool including a pressure adjusting means for maintaining injection pressure within the range of the filling pressure. The pressure adjusting means in one embodiment of the invention comprises spring biased pins communicating with an interior of the second molding tool which are displaced by the filling pressure to maintain the filling pressure within a desired range.

The above, and other objects, features and advantages of the present invention will become apparent from the following description read in conjunction with the accompanying drawings, in which like reference numerals designate the same elements.

DETAILED DESCRIPTION OF THE INVENTION

Figure 1:
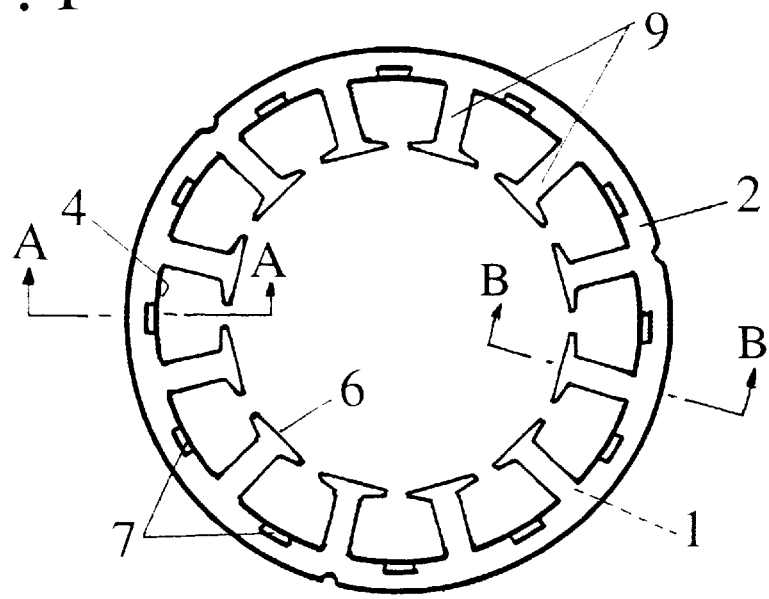
FIG. 1 shows a plane view of an embodiment of the present invention having a lamination stack with an insulator insertmolded.
Figure 2:
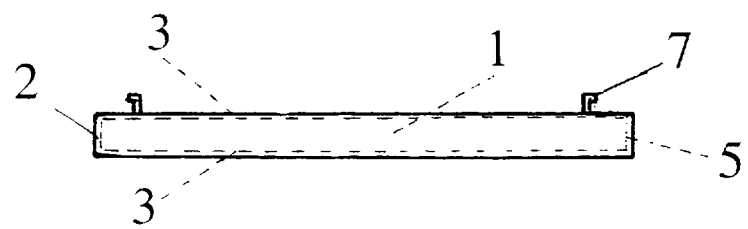
FIG. 2 shows the front view of the lamination stack with the insulator insertmolded of FIG. 1 with a winding guide is partially omitted.
Figure 3:
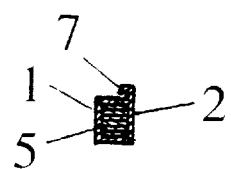
FIG. 3 shows the cross section along line A—A of FIG. 1.
Figure 4:
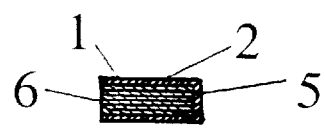
FIG. 4 shows the cross section along line B—B of FIG. 1.

Referring to FIGS. 1 to 5, there is shown an embodiment of a product and method of the present invention wherein a lamination stack 1 is produced for use as a stator in a spindle motor for use in a hard disk unit. The lamination stack 1 is formed from multiple thin steel laminations stacked and lock together. The lamination stack 1 is inserted into a first molding tool of an injection molding machine, and an insulator 2 is undermolded onto the lamination stack using a high flow thermoplastic resin material. The undermolded insulator 2 forms a first insulating layer, which also called an undermold and is preferably less than 0.2 mm in thickness.

The insulator 2 is molded to cover both top and bottom surfaces 3 of the lamination stack 1, slots 4, and an outer surface 5. Furthermore, the insulator 2 is optionally undermolded to cover the whole surface of the lamination stack 1 including an inner surface 6 collectively formed by ends of radially extended pole portions provided in the form of teeth 9, and which defines an opening where the rotor is inserted. Winding guides 7 are formed on the surface 3 from the same resin as the insulator 2 during the undermolding. The insulator 2 preferably covers the whole surface at a thickness of less than 0.2 mm, including the inner surface 6. Optionally, depending on the usage, the whole surface excluding the outer surface 5 is covered.

Figure 5:
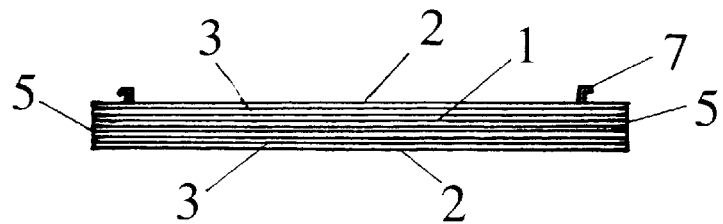
FIG. 5 shows the front view of a lamination stack of another embodiment of the present invention having the insulator insertmolded wherein the illustration of a winding guide is partially omitted.

Referring to FIG. 5, the insulator 2 is molded using the first molding tool to cover both the top and bottom surfaces 3 of the lamination stack 1 and slot 4, and the winding guide is formed on the surface 3 of the insulator 2. Thin thickness insert molding (less than 0.2 mm thickness) combined with simultaneous formation of the winding guide 7 and the insulation 2, and the configuration of the winding guide 7 are epochal aspects of the present invention. The configuration of the winding guide 7 is not necessarily of a hook shape such as "Γ" as shown, but may be simply a straight member projecting perpendicularly from or on a slant from the top surface 3.

The synthetic resin used to mold the insulator 2 is preferably a high flow thermoplastic material having electrical insulating characteristic. Examples of such a resin include nylon 66, PBT resin, LCP resin, or PPS resin. The terminology "high flow" as used herein defines a resin of having a melted viscosity of less than $7 \times 10^3$ poise at a shear rate (shear speed) of $10^2$ (1/second), and less than $3 \times 10^3$ poise of melted viscosity at the shear rate of $10^3$ (1/second), when the resin is molten at the necessary temperature for molding.

Figure 6:
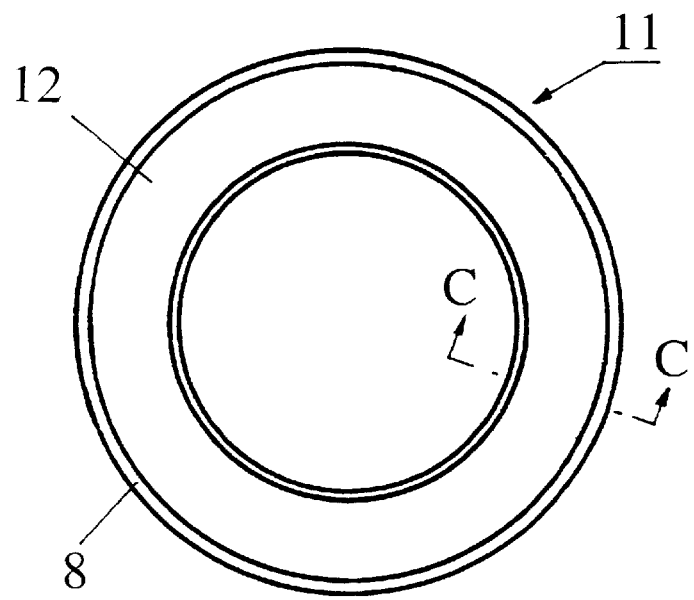
FIG. 6 shows a plan view of the overmolded stator of the present invention.
Figure 7:
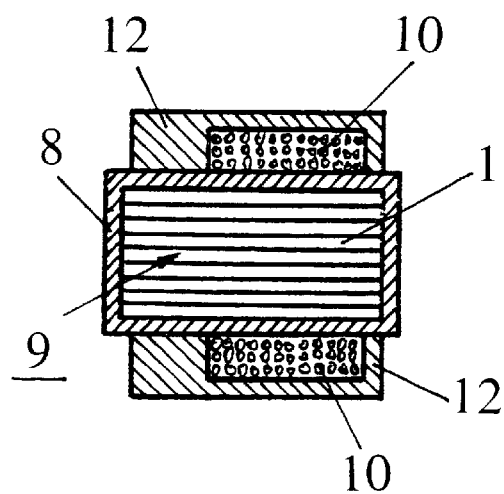
FIG. 7 shows the enlarged cross section along line C—C of FIG. 6.

Referring to FIGS. 6 and 7, the manufacturing method of the present invention is described below with relation to the above described overmolded lamination stator 1. The insulator 2 is identified as "the undermold 8" in the following explanation. Teeth 9, of the lamination stack 1 with the undermold 8, have coil wire wound thereon to form a winding 10. The construction of the winding 10 is accomplished using known winding techniques.

The undermolded lamination stack 1 with the windings 10 formed thereon are inserted in a second molding tool. In the second molding tool a gate is disposed at a position where injected resin does not directly hit the windings 10 of the stator 11. The same type of high flow thermoplastic resin as is used for the above mentioned insulator 2 is then injection molded over the stator 11 to form an overmold 12 so that the windings 10 are enclosed in a coating of the resin. The overmold 12 prevents exposure of the windings 10 to the outside environment, for example, the interior of a hard disk drive unit.

During injection molding of the overmold 12, depending on the configuration of the product to be molded and the resin material to be used, the peak filling pressure of the resin is preferably 20–60% lower than the normally used filling pressure, and the injection speed is preferably higher than the normal speed by more than two times. In general, injection molding is done with a peak filling pressure normally between 70 kg/cm$^2$ and 150 kg/cm$^2$. Where a normal peak filling pressure is 70 kg/cm$^2$ (against material and product) during normal molding, the present invention preferably uses a peak filling pressure between 15 kg/cm$^2$ and 40 kg/cm$^2$. Where the peak filling pressure during normal molding is 150 kg/cm$^2$, the peak filling pressure in the present invention is preferably between 30 kg/cm$^2$ and 90 kg/cm$^2$.

For use in formation of the overmold 12, spring operated movable pins for pressure adjustment are provided communicating with a cavity of the molding tool. When the resin injection pressure is applied, the pins are depressed by the resin pressure and function as dampers to reduce rapid pressure increase in the molding tool to ensure that the windings 10 will not be disturbed by the resin injection pressure. This pressure adjustable system is effective when the resin peak filling pressure is high.

The injection speed is preferably more than twice the injection speed used in a normal injection molding process. For example, an embodiment of the present invention preferably uses an injection speed of more than 270 mm/sec which is more than twice of the standard injection speed of 135 mm/sec. Injection molding machines are available which are capable of injection speeds of up to 1000 mm/sec. When the injection speed is increased twice, the injection filling time will be minimized by half.

In an embodiment of the present invention the coil wire for the windings 10 is, for example, a copper wire having a diameter of 0.13 mm with insulation of coated polyurethane (155° C. of heat resistance temperature) of which a coating thickness is 0.01 mm. With the above conditions (filling pressure and injection speed), damage to the coating material of even this kind of coil wire is prevented. The temperature of the molding tool is preferably between 30° C. and 80° C., and more preferably less than 50° C., since too high a temperature of the molding tool may cause deflection of the undermold 8 and heat to be conducted to the windings 10 should be minimized. Also, by locating the gate at a position where the injected resin will not directly hit the coil wire 10, disturbance of the wound coil is prevented. In an embodiment of the present invention, a gate is preferably located inside of the slots 4 and between coils wound on the teeth 9 such that resin is injected in a direction perpendicular to an axis of the stator 11. It is desirable to increase the number of the gates to complete injection molding in a shorter time, but this should be decided depending on the size of the stator or the number of poles. The high flow thermoplastic resin to be used in the overmold 12 is to be the same type of resin used in the undermold 8 to promote appropriate coordination of resin. The molding temperature of the resin is preferably 300° C. Using this kind of high heat resistance resin for overmolding, a high durability motor is producible.

As is stated above, the overmolded stator prevents disbursement of contaminants from windings during motor operation and reduces vibration and noise generated by electric current pulse.

In accordance with the manufacturing method for the overmolded stator, the overmolded stator can be easily manufactured by injection molding without damaging the wound coil, and small-sized and high performance spindle motors are thus producible.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A stator, comprising:
    a lamination stack including a top surface, a bottom surface and an outer surface, said lamination stack further including radially extended pole portions, opposed surfaces of adjacent ones of said pole portions defining slots therebetween, ends of said pole portions collectively presenting an inner surface defining an opening for receiving a rotor said inner surface facing the rotor when same is received within the opening;
    a first electrically insulating layer of high flow thermoplastic synthetic resin insert-molded on said lamination stack and covering at least a portion of each of said top, bottom and opposed surfaces;
    a coil wound onto said lamination stack and over said first electrically insulating layer; and
    a second electrically insulating layer molded over said coil to encase said coil, said second electrically insulating layer being formed by injection molding and being comprised of said high flow thermoplastic synthetic resin used for said first electrically insulating layer.

2. The stator according to claim 1, further comprising coil winding guides formed of said high flow thermoplastic synthetic resin insert-molded integrally with said first electrically insulating layer.

3. The stator according to claim 1, wherein said first electrically insulating layer has a thickness of less than about 0.2 mm.

4. The stator according to claim 1, wherein said first electrically insulating layer further covers at least a portion of at least one of said inner and outer surfaces.

5. A stator for precision motors, comprising:
    a lamination stack;
    a first insulation layer injection molded onto said lamination stack and coil winding guides formed simultaneously with the first insulation layer on a top side of said lamination stack, said first insulation layer and said coil winding guides being formed of a high flow thermoplastic synthetic resin which is an electrical insulator, said first insulation layer coating at least top and bottom surfaces and surfaces of slots of said lamination stack in the form of a thin resin skin insulation;
    a coil of insulated thin copper wire wound over said first insulation layer and said winding guides; and
    a second insulator layer injection molded on said coil using said high flow thermoplastic synthetic resin used for said first insulation layer and said coil winding guides to encase said coil and inhibit exposure of said coil to an outside environment.

6. The stator according to claim 5, wherein said first insulation layer has a thickness of less than about 0.2 mm.

7. The stator according to claim 5, wherein said copper wire has a diameter of no greater than about 0.13 mm.

8. A method for producing a stator with a lamination stack, comprising:
    inserting the lamination stack into a first molding tool installed on an injection molding machine;
    injection molding onto said lamination stack a first insulation layer, which is a thin resin skin, and coil winding guides, each being formed of a high flow thermoplastic synthetic resin which is an electrical insulator, said first insulation layer coating at least top and bottom surfaces and surfaces of slots of said lamination stack and said coil winding guides being formed integral with said first insulation layer on said top surface of said lamination stack;
    winding a coil of insulated thin copper wire over said first insulation layer and said winding guides;
    inserting said lamination stack with said coil into a second molding tool having an interior cavity for accepting said lamination stack and a gate communicating with said interior cavity and disposed at a location where injected resin will not directly hit said coil; and
    injection molding a second insulator layer on said coil using said high flow thermoplastic synthetic resin injected at a peak filling pressure in a range about 20 to 60% lower than a standard value for said high flow thermoplastic synthetic resin and at an injection speed more than twice as high as a standard injection speed for said high flow thermoplastic synthetic resin.

9. The manufacturing method of claim 8, wherein said second molding tool includes a pressure adjusting means for maintaining injection pressure within the range of said peak filling pressure.

10. The manufacturing method of claim 9, wherein said pressure adjusting means includes spring biased pins supported in holes communicating with said interior cavity of said second molding tool such that filling pressure displaces said spring biased pins away from said interior cavity to maintain said injection pressure.

11. The method according to claim 8, wherein a temperature of said second molding tool is between about 30° and about 80° C.

12. The method according to claim 8, wherein a temperature of said second molding tool is less than about 50° C.

13. The method according to claim 8, wherein a molding temperature of said high flow thermoplastic synthetic resin is about 300° C.

14. The method according to claim 8, wherein said peak filling pressure in said step of injection molding a second insulator layer on said coil is between about 15 kg/cm$^2$ and about 40 kg/cm$^2$.

15. A method for producing a stator with a lamination stack, comprising:
    inserting the lamination stack into a first molding tool installed on an injection molding machine;
    injection molding onto said lamination stack a first insulation layer formed of a high flow thermoplastic synthetic resin which is an electrical insulator, said first insulation layer coating at least portions of top and bottom surfaces and surfaces of slots of said lamination stack;

winding a coil of insulated wire over said first insulation layer;

inserting said lamination stack with said coil into a second molding tool having an interior cavity for accepting said lamination stack and a gate communicating with said interior cavity and disposed at a location where injected resin will not directly hit said coil; and injection molding a second insulator layer on said coil using said high flow thermoplastic synthetic resin injected at a peak filling pressure in a range about 20 to 60% lower than a standard value for said high flow thermoplastic synthetic resin and at an injection speed more than twice as high as a standard injection speed for said high flow thermoplastic synthetic resin.

16. The method according to claim 15, wherein the first insulation layer is a thin resin skin.

17. The method according to claim 15, wherein coil winding guides formed of said high flow thermoplastic synthetic resin are formed integral with said first insulation layer on said top surface of said lamination stack during said step of injection molding onto said lamination stack a first insulation layer.

18. The method according to claim 15, wherein a temperature of said second molding tool is between about 30° and about 80° C.

19. The method according to claim 15, wherein a temperature of said second molding tool is less than about 50° C.

20. The method according to claim 15, wherein a molding temperature of said high flow thermoplastic synthetic resin is about 300° C.

21. The method according to claim 15, wherein said peak filling pressure in said step of injection molding a second insulator layer on said coil is between about 15 kg/cm$^2$ and about 40 kg/cm$^2$.

* * * * *